United States Patent Office 3,792,017
Patented Feb. 12, 1974

---

3,792,017
THERMALLY STABLE QUINOXALINE POLYMERS AND METHOD OF SYNTHESIS
Fred E. Arnold, Centerville, and Frederick L. Hedberg and Robert F. Kovar, Dayton, Ohio, assignors to the United States of America as represented by the Secretary of the Air Force
No Drawing. Filed Oct. 19, 1972, Ser. No. 298,975
Int. Cl. C08g 15/00
U.S. Cl. 260—47 R      6 Claims

ABSTRACT OF THE DISCLOSURE

Thermally stable quinoxaline polymers are prepared by solution polycondensation of certain aromatic heterocyclic fused tetraamines with aromatic dibenzils. The high thermal stability, the high glass transition temperature, or the lack of such a temperature, and the solubility of the polymers in aprotic solvents render them especially useful as adhesives and in high temperature applications such as in the fabrication of plastic composites and protective coatings.

FIELD OF THE INVENTION

This invention relates to polymeric materials which exhibit a high degree of thermal stability. In one aspect it relates to polymeric materials which have either a high glass transition temperature or do not exhibit such a temperature. In another aspect it relates to a method for synthesizing the polymeric materials.

BACKGROUND OF THE INVENTION

While the literature discloses a variety of polymers possessing a relatively high degree of thermal stability, such prior art polymers have not proven to be entirely satisfactory. For example, they are generally difficult to synthesize and to use in many applications because they are substantially insoluble in common solvents. Since the polymers are substantially insoluble in common solvents, an acid, such as sulfuric acid or polyphosphoric acid, must be employed as the reaction medium or in forming solutions of the polymers. Of even greater significance, the prior are polymers usually have a comparatively low glass transition temperature. The glass transition temperature ($T_g$) of a polymer is that temperature at which the polymer changes its form as a result of movement of polymer chain segments. The glass transition temperature limits the use temperature of a material since mechanical failure occurs at that temperature. Thus, it is desirable for a polymer to have a high glass transition temperature or even more desirably no glass transition temperature.

It is an object of this invention, therefore, to provide a polymer having a high degree of thermal stability and either a high glass transition temperature or no glass transition temperature at all.

Another object of the invention is to provide a heat resistance polymer which is soluble in aprotic solvents.

A further object of the invention is to provide a method whereby the polymers can be readily synthesized.

Other objects and advantages of the invention will become apparent to those skilled in the art upon consideration of the accompanying disclosure.

SUMMARY OF THE INVENTION

The present invention resides in a thermally stable polymer having a high glass transition temperature or no glass transition temperature. The polymer consists essentially of repeating units having the following formula:

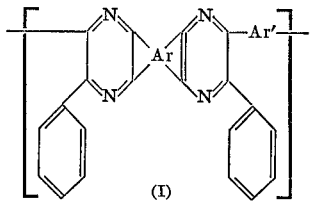

(I)

wherein Ar is one of the following radicals:

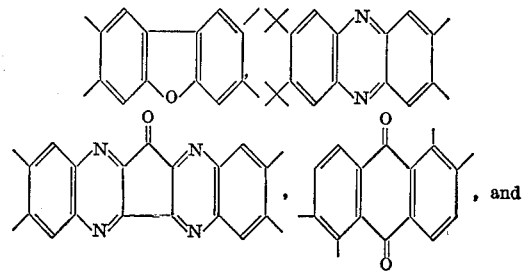

and wherein Ar' is one of the following radicals:

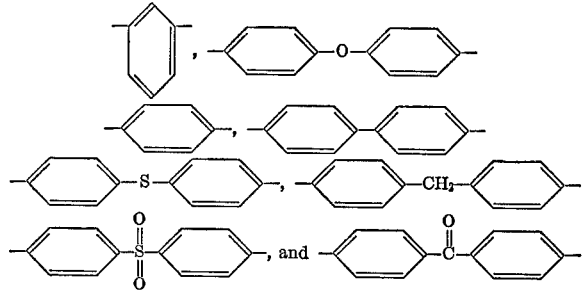

There are generally at least two and preferably at least four of the recurring units in the polymer. In general, the number of recurring units is such that the polymers have an inherent viscosity of 0.25 to 1.0 dl./g. in sulfuric acid.

In one embodiment, the present invention resides in a method for preparing the quinoxaline polymers. The condensation reaction involved is illustrated by the following equation:

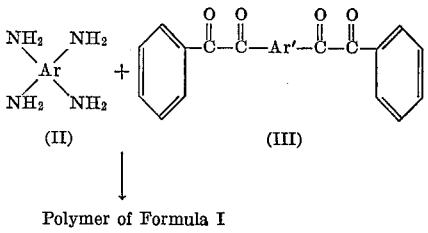

(II)            (III)

↓

Polymer of Formula I

In the foregoing formulae, Ar and Ar' are as defined hereinabove.

The reaction illustrated by the foregoing equation is carried out in an inert atmosphere, using an aprotic solvent as the reaction medium. Examples of gases that can be used to provide an inert atmosphere include nitrogen, argon, helium, and the like. Examples of suitable aprotic solvents include m-cresol, dimethyl formamide, dimethyl acetamide, hexamethyl phosphoramide, tetramethyl urea, dimethyl sulfoxide, and the like. It is usually preferred to employ m-cresol as the reaction medium. Generally, the reaction is conducted at a temperature ranging from about room temperature to 200° C. for a period of about 5 to 25 hours. Upon completion of the reaction, the product is conveniently recovered by adding the reaction mixture to an alcohol, such as methanol, thereby precipitating the polymer from solution. After recovery of the precipitated polymer, as by filtration or decantation, it is washed with an alcohol and finally air dried or dried under reduced pressure. In order to purify the polymer further, it is within the scope of the invention to repeat the foregoing procedure one or more times, i.e., dissolution of the dried polymer in a solvent, precipitation of the polymer by adding the solution to an alcohol, separation of the precipitated polymer, and drying of the separated polymer.

In synthesizing the polymers of this invention, the reactants or monomers are usually used in equimolar amounts. While a small excess of one of the reactants is not detrimental to the condensation reaction, a considerable excess of one of the reactants results in the production of lower molecular weight products. The following are examples of the tetraamine monomers of Formula II that are employed in the preparation of the products: 2,3,7,8-tetraaminodibenzofuran; 2,3,7,8-tetraaminophenazine; 2,3,8,9 - tetraaminodiquinoxal(2,3-e,2', 3'-1)-cyclopentanepentone; 2,3,11,12 - tetraaminoanthraquinone. Dibenzil monomers of Formula III that can be used in the polycondensation reaction include p,p'-oxydibenzil[p,p'-(phenylglyoxalyl) diphenylether];
1,3-(phenylglyoxaloyl) benzene;
p,p'-(phenylglyoxaloyl) benzene;
p,p'-(phenylglyoxaloyl) diphenylsulfide;
p,p'-(phenylglyoxaloyl) biphenyl;
p,p'-(phenylglyoxaloyl) diphenylmethylene;
p,p'-(phenylglyoxaloyl) diphenylsulfone; and
p,p'-(phenylglyoxaloyl) benzophenone.

A more complete understanding of the invention can be obtained by referring to the following illustrative examples which are not intended, however, to be unduly limitative of the invention. The dibenzils disclosed herein are well known compounds that are described in the literature. Except for 2,3,7,8-tetraaminodibenzofuran, and 2,3,8,9 - tetraaminodiquinoxal(2,3-e,2',3'-1)cyclopentanepentone, procedures for preparing the tetraamine monomers are also disclosed in the literature. The aforementioned tetraamine were synthesized as described in Examples I and II.

EXAMPLE I

Preparation of 2,3,7,8-tetraaminodibenzofuran (a) 3,8-dinitrodibenzofuran.—To a solution of 50.0 g. (0.298 mole) of dibenzofuran in 500 ml. of acetic acid at 90° C. was added 250 ml. of fuming nitric acid (90+%) in 2 hours. After 45 minutes, a thick precipitate formed which redissolved near the end of the addition when a thick precipitate formed again. After the reaction mixture was stirred and heated at 90 to 95° C. for an additional 3 hours, it was cooled to 17° C. and filtered. The precipitate, washed free of acid with water and air dried, weighed 60.0 g. (78%, crude yield) and had a melting range of 216–226° C. Recrystallization from 2,220 ml. of butanone gave 30.6 g. (40%) of 3,8-dinitrodibenzofuran, M.P. 247–252° C.

Two additional runs were carried out, using 200.0 g. (1.19 mole) of acetic acid and 1000 ml. of fuming nitric acid. In one run 130.4 g. (42.6% yield) of 3,8-dinitrobenzofuran (M.P. 243–247° C.) was obtained while 136.0 g. (44.3% yield) of the product (M.P. 245–250° C.) was produced in the other run.

(b) 2,3,7,8-tetranitrodibenzofuran.—A mixture of 310 ml. of concentrated sulfuric acid and 310 ml. of fuming nitric acid (90+%) was cooled in an ice bath to 3° C. and 60.0 g. (0.232 mole) of 3,8-dinitrodibenzofuran was added during a 2 hour period with good agitation. The mixture was stirred at 3–5° C. for 3 hours, then poured into 2 liters of ice water. The precipitate, isolated by filtration and washed acid free with water and air dried, weighed 79.1 g. (98%) and had a melting range of 180–230° C. The solid, extracted in 600 ml. of refluxing toluene, then in 500 ml. of refluxing toluene left 28.9 g. of solid which melted at 268–285° C. One recrystallization from 650 ml. of acetic acid gave 22.8 g. (28.3%) of 2,3,7,8-tetranitrodibenzofuran, M.P. 284–288° C.

(c) 2,3,7,8-tetraaminodibenzofuran (hydrochloride salt).—A 1.0 g. sample of 2,3,7,8-tetranitrodibenzofuran was slurried in 150 ml. of methanol. To the slurry was added approximately 0.2 g. of Adam's catalyst ($PtO_2$) and 10 ml. of methanol containing approximately 0.42 mg. of anhydrous hydrogen chloride per milliliter. The mixture was then shaken on a Parr hydrogenation apparatus for 1 hour under 50 p.s.i.g. of hydrogen. The required pressure drop was observed within 15 minutes. The catalyst was removed by filtration, and the solvent evaporated in vacuo to obtain a yellow-green solid. The solid was slurried with acetone, filtered, and air dried to afford 1.0 g. of green product, M.P. >350° C. The infrared spectrum of the sample was indicative of an amine hydrochloride. A total of 36 reactions were carried out on a 2.0 g. scale to give 77.0 g. of amine salt.

(d) 2,3,7,8-tetraaminodibenzofuran (free amine).—To a solution of 27 g. of amine salt prepared as described in paragraph (c) in 2,700 ml. of methanol was added 27 ml. of concentrated hydrochloric acid and 36 ml. of water. Under a nitrogen atmosphere, 57.5 g. of triethylamine in 360 ml. of methanol was added dropwise over a period of 30 minutes. Near the end of the addition, a solid precipitated and the solution turned a deep purple. After completion of the addition, 15 g. of additional triethylamine was added to increase the alkalinity of the mixture.

The mixture was stirred for 4 hours at room temperature, and then filtered under nitrogen. The solid was combined with the product isolated from a second identical reaction, and dried at room temperature at 0.1 mm. Hg without a drying agent for 24 hours.

A total of 10.8 g. (20% conversion) of 2,3,7,8-tetraaminodibenzofuran was recovered, M.P. 317–319° C.

*Analysis.*—Calcd. for $C_{12}H_{12}N_4$ (percent): C, 63.14; H, 5.30; N, 24.54. Found (percent): C, 63.12; H, 5.34; N, 24.60.

EXAMPLE II (a) Preparation of 2,3,8,9-tetra(p-toluenesulfonamido) diquinoxal-(2,3-e,2,3'-1)cyclopentapentone A mixture of 6.4 g. (14 mmole) of 1,2-diamino-4,5-o-phenylene-bis(toluenesulfonamide) and 1.6 g. (7 mmole) of leuconic acid pentahydrate (cyclopentanepentone) in 100 ml. of m-cresol was heated at reflux under nitrogen for 3 hours. The reaction mixture was then evaporated to near dryness in vacuo, and the tarry residue dissolved in a minimum of acetone. The resulting solution was filtered, and the filtrate added to 200 ml. of hexane, thereby precipitating a brown solid. The product was collected and reprecipitated from acetone by the previously described procedure. The product thus obtained was dried at 80° C. in vacuo, yielding 7.4 g. (96%) of 2,3,8,9-tetra(toluenesulfonamido) - diquinoxal-(2,3-e,2'3'-1)cyclopentanepentone as an amorphous brown powder, M.P. 245° C. (dec.).

*Analysis.*—Calcd. for $C_{45}H_{36}N_8O_9S_4$ (percent): C, 56.24; H, 3.78; N, 11.66. Found (percent): C, 56.95; H, 3.70; N, 11.20.

(b) Preparation of 2,3,8,9-tetraaminodiquinoxal (2,3,-e,2',3'-1)-cyclopentanepentone To 100 ml. of de-aerated sulfuric acid was added 5.0 g. (5.1 mmole) of finely powdered, 2,3,8,9-tetra(p-toluenesulfonamido)diquinoxal(2,3 - e,2',3'-1)cyclopentanepentone. The stirred mixture was heated at 60° C. under nitrogen for one hour, at which time it was cooled to 0° C. and poured over ice, thereby precipitating a blue-black solid. The amine salt thus formed was collected, washed with water and air dried. The solid material was then extracted with several portions of boiling 10% methanolic KOH, and the combined extracts filtered by suction and poured into a large volume of water. The resulting suspension was heated on a steam bath until all of the methanol had boiled away, leaving a blue-black precipitate of 2,3,8,9-tetraaminodiquinoxal (2,3-e,2',3'-1)cyclopentanepentone. The material was collected, washed with water and dried under reduced pressure yielding 1.5 g. (83%) of product.

*Analysis.*—Calcd. for $C_{17}H_{12}N_8O$ (percent): C, 59.16; H, 3.74; N, 32.47. Found (percent): C, 58.70; H, 3.50; N, 31.82.

EXAMPLE III

Poly[(3,9-diphenylfuro[2,3-g:4,5-g']diquinoxaline-2,10-diyl)-p-phenyleneoxy-p-phenylene A mixture of 2.283 g. (0.0100 mole) of 2,3,7,8-tetraaminodibenzofuran and 4.344 g. (0.0100 mole) of p,p'-oxydibenzil was stirred and flushed with nitrogen for 15 minutes, and then 200 ml. of freshly distilled m-cresol was added. The reaction mixture was stirred at 23° C. under nitrogen for 20 hours to give a viscous brown solution, which was precipitated into 1.0 liter of anhydrous methanol. The resultant yellow precipitate was collected, washed with methanol, and dried under reduced pressure. The crude product was dissolved in m-cresol and reprecipitated into methanol. After washing with methanol and drying under reduced pressure at 150° C. for 16 hours, the polymer weighed 5.4 g. (92%), and had an inherent viscosity of 0.74 dl./g. in concentrated sulfuric acid (0.3 g./100 ml. at 30° C.). Good films were cast from m-cresol solutions of the polymer.

*Analysis.*—Calcd. for $(C_{40}H_{22}N_4O)_n$ (percent): C, 81.34; H, 3.76; N, 9.49. Found (percent): C, 79.86, 79.77; H, 3.96, 3.83; N, 8.47, 8.70.

EXAMPLE IV

Poly[(3,9-diphenyldipyrazino[2,3-b:2',3'-1]phenazine-2,10-diyl)-p-phenyleneoxy-p-phenylene]

To 30 ml. of freshly distilled m-cresol was added, under a nitrogen atmosphere, 0.3318 g. (0.137 mmole) of 2,3,7,8-tetraaminophenazine and 0.5980 g. (0.137 mmole) of p,p'oxydibenzil. The mixture was stirred overnight at room temperature to produce a homogeneous dark red solution which was heated to 120° C. and maintained at that temperature for 6 hours. The solution was then allowed to cool to room temperature and the polymer was precipitated into 500 ml. of anhydrous methanol. The resulting dark red solid was collected, washed with methanol, dissolved in m-cresol, and reprecipitated into methanol. After washing with methanol and drying under reduced pressure at 150° C. for 16 hours, the polymer weighed 0.79 g. (96%) and had an inherent viscosity of 0.32 dl./g. in concentrated sulfuric acid (0.3 g./100 ml. at 30° C.).

*Analysis.*—Calcd. for $(C_{40}H_{22}N_6O)_n$ (percent): C, 78.85; H, 3.51; N, 13.96. Found (percent): C, 78.92; H, 3.95; N, 13.10.

EXAMPLE V

Poly[15-oxo-3,10-diphenyl-15H-dipyrazino[2,3-g:2',3'-g']cyclopenta[1,2-b:3,4-b']diquinoxaline-2,11 - diyl) - p-phenyleneoxy-p-phenylene]

To a 20 ml. of de-aerated m-cresol was added under nitrogen 0.500 g. (1.45 mmole) of 2,3,8,9-tetraaminodiquinoxal)-2,3-e,2',3'-i)-cyclopentanepentone and 0.630 g. (1.45 mmole) of p,p'-oxydibenzil. The mixture was stirred overnight at room temperature, during which time only slight evidence of reaction became apparent. The reaction mixture was therefore heated at a reflux for an additional 8 hours, affording a dark, homogeneous solution. The polymer solution was precipitated into 500 ml. of methanol, and the resulting dark solid was collected, washed with methanol, and air dried yielding 0.820 g. of crude product. The polymer was further purified by reprecipitation from m-cresol into methanol. The purified material was collected, washed with methanol, and dried under reduced pressure. The polymer exhibited an inherent viscosity of 0.45 dl./g. in m-cresol.

*Analysis.*—Calcd. for $C_{45}H_{22}H_8O_2$ (percent): C, 76.48; H, 3.14; N, 15.86. Found (percent): C, 74.93; H, 3.01; N, 14.73.

EXAMPLE VI

Poly[(8,18-diphenylpyrazino[2,3-i]pyrazino[2'',3'':6',7']quinoxalino[2',3':9,10]phenanthro[4,5 - abc]phenazine-7,19-diyl)-p-phenyleneoxy-p-phenylene]

To 100 ml. off freshly distilled m-cresol was added, under a nitrogen atmosphere, 0.2845 g. (0.6098 mmole) of 2,3,11,12 - tetraaminodiquinoxal[2,3-e,2',4'-]pyrene and 0.2649 g. (0.6098 mmole) of p,p'-oxydizenzil. The mixture was heated at the rate of 3° C./min. to 120° C. and maintained at that temperature for 18 hours. The solution was then allowed to cool to room temperature and the polymer was precipitated into 700 ml. of anhydrous methanol. The dark red solid material was dissolved in methane sulfonic acid and reprecipitated into anhydrous methanol. After washing with methanol and drying under reduced pressure at 150° C. for 16 hours, the polymer, 0.50 g. (98%), had an inherent viscosity of 0.43 dl./gm. in concentrated sulfuric acid (0.3 g./100 ml. at 30° C.).

*Analysis.*—Calcd. for $(C_{56}H_{28}ON_8)_n$ (percent): C, 81.14; H, 3.40; N, 13.51. Found (percent): C, 80.03; H, 3.10; N, 13.02.

EXAMPLE VII

Polymerization of 1,2,5,6-tetraaminoanthraquinone with p,p'-bis(phenylglyoxaloyl)diphenylether To 25 g. of de-aerated m-cresol was added 0.5000 g. (1.86 mmole) of 1,2,5,6-tetraaminoanthraquinone and 0.8081 g. (1.86 mmole) of p,p'-bis(phenylglyoxaloyl)diphenylether. The resulting mixture was stirred overnight at room temperature under nitrogen, and then heated for 8 hours at reflux, affording a dark, homogenous solution. The polymer solution was then precipitated into 500 ml. of methanol, and the resulting solid polymer was collected, washed with methanol, and dried under reduced pressure. The polymer exhibited an inherent viscosity of 0.43 dl./g. in m-cresol.

*Analysis.*—Calcd. for $C_{42}H_{22}N_4O_3$ (percent): C, 79.99; H, 3.52; N, 8.88. Found (percent): C, 78.13; H, 3.40; N, 7.92.

The glass transition temperature of the polymers of Examples III–VI was determined. The results of the determinations as well as the inherent viscosity of the polymers are recorded below in the table.

TABLE

| Polymer of example— | Inherent viscosity (dl./g.) | Transition temperature, °C. |
|---|---|---|
| III | [1] 0.74 | 406 |
| IV | [1] 0.32 | None |
| V | [2] 0.45 | None |
| VI | [1] 0.43 | None |
| VII | [2] 0.43 | None |

[1] 0.3% in $H_2SO_4$ at 30° C.
[2] 0.3% in m-cresol at 30° C.
[3] Determined by differential thermal analysis method.

As seen from the data in the foregoing table, the polymers of this invention have a very high glass transition temperature (polymer of Example III) or no glass transition temperature (polymers of Examples IV–VII). The fact that the polymers of this invention possess this characteristic is of great significance. This is because the glass transition temperature of a polymer or resin limits its use temperature as mechanical failure results at that temperature. The polymers of this invention are eminently suitable for use in fabricating composites that are to be subjected to high temperatures. Thus, the polymers are particularly useful in aerospace applications such as in the manufacture of nose cones and heat shields for space vehicles, rocket engine components and the like.

As will be evident to those skilled in the art, modifications of the present invention can be made in the light of the foregoing disclosure. Such modifications fall within the spirit and scope of the invention.

We claim:

1. A thermally stable polymer consisting essentially of repeating units having the following formula:

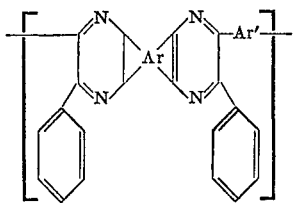

wherein Ar is one of the following radicals:

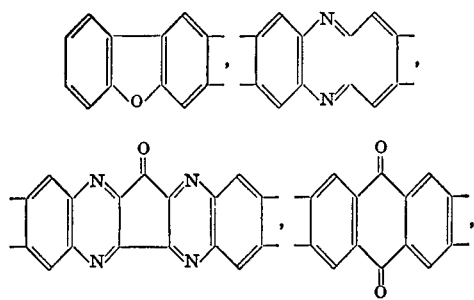

and

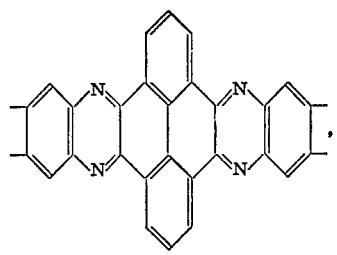

and wherein Ar' is one of the following radicals:

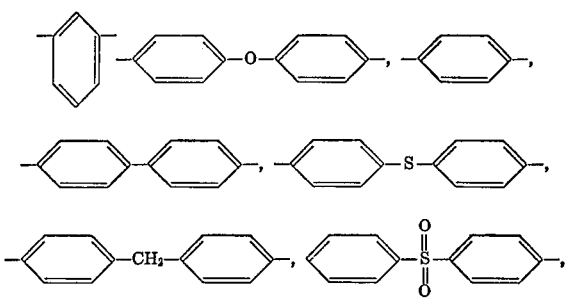

and

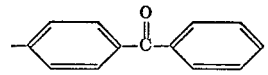

2. The polymer of claim 1 in which Ar is

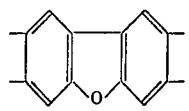

and Ar' is

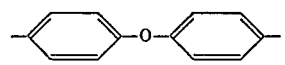

3. The polymer of claim 1 in which Ar is

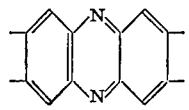

and Ar' is

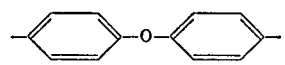

4. The polymer of claim 1 in which Ar is

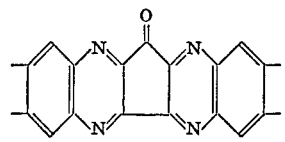

and Ar' is

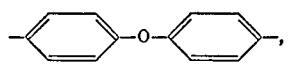

5. The polymer of claim 1 in which Ar is

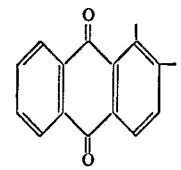

and Ar' is

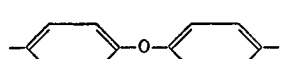

6. The polymer of claim 1 in which Ar is
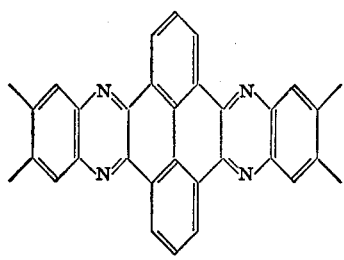
and Ar' is
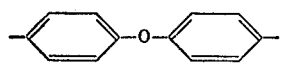
References Cited
UNITED STATES PATENTS
| | | |
|---|---|---|
| 3,475,374 | 10/1969 | Marvel et al. |
| 3,563,917 | 2/1971 | Marvel. |
| 3,661,850 | 5/1972 | Stille. |
| 3,734,818 | 5/1973 | Stille. |
OTHER REFERENCES
Bracke et al., J. Polym. Sci.: Part A–1, 8, 3177–87 (1070).
Szita et al., J. Polym. Sci.: Part A–1, 9, 691–700 (1971).
MELVIN GOLDSTEIN, Primary Examiner
U.S. Cl. X.R.
260—49, 50, 65